United States Patent [19]

Hitomi

[11] Patent Number: 4,728,053
[45] Date of Patent: Mar. 1, 1988

[54] DRAG MECHANISM FOR A SPINNING FISHING REEL

[75] Inventor: Yasuhiro Hitomi, Sakai, Japan

[73] Assignee: Shimano Industrial Company Limited, Osaka, Japan

[21] Appl. No.: 68,765

[22] Filed: Jun. 29, 1987

Related U.S. Application Data

[63] Continuation of Ser. No. 913,316, Sep. 30, 1986, abandoned.

[30] Foreign Application Priority Data

Oct. 9, 1985 [JP] Japan .................. 60-154754[U]
Jul. 8, 1986 [JP] Japan .................. 61-104609[U]

[51] Int. Cl.$^4$ .................. A01K 89/01; A01K 89/02
[52] U.S. Cl. .................. 242/84.5 A; 464/45
[58] Field of Search .......... 242/84.2 R, 84.21 R, 242/84.5 A, 84.51 A, 217, 218, 219; 464/45

[56] References Cited

U.S. PATENT DOCUMENTS

| 2,896,874 | 7/1959 | Nurmse | 242/218 |
| 3,184,179 | 5/1965 | Wood, Jr. | 242/217 |
| 3,572,607 | 3/1971 | Wilson | 242/218 |
| 3,604,658 | 9/1971 | Nurmse et al. | 242/218 |
| 3,966,140 | 6/1976 | Coquelet et al. | 242/217 |
| 4,416,428 | 11/1983 | Noda | 242/84.21 R |
| 4,572,448 | 2/1986 | Ban | 242/84.5 A |

FOREIGN PATENT DOCUMENTS

| 0181027 | 5/1986 | European Pat. Off. . |
| 1017055 | 1/1966 | United Kingdom . |
| 1147107 | 4/1969 | United Kingdom . |
| 1333432 | 10/1973 | United Kingdom . |
| 1345553 | 1/1974 | United Kingdom . |
| 1462249 | 1/1977 | United Kingdom . |
| 1469447 | 4/1977 | United Kingdom . |

Primary Examiner—Billy S. Taylor
Attorney, Agent, or Firm—Stevens, Davis, Miller & Mosher

[57] ABSTRACT

A drag mechanism for applying a braking force against rotation of a spool with respect to a spool shaft of a spinning fishing reel. The drag mechanism is provided with a first adjuster for setting a minimum braking force and a second adjuster for adjusting the minimum braking force to a maximum braking force. As a result the braking force is easy to adjust while compensating the minimum braking force.

14 Claims, 14 Drawing Figures

DRAG MECHANISM FOR A SPINNING FISHING REEL

This application is a continuation of application Ser. No. 913,316, filed Sept. 30, 1966 and now abandoned.

Field of the Invention

This invention relates to a drag mechanism for a spinning fishing reel, and more particularly against to a drag mechanism for exerting braking action against rotation of a spool with respect to a spool shaft in a spinning fishing reel of the type wherein the spool is rotatably supported at the front of the spool shaft so that a fishing line is wound onto the spool by a rotor supported to a reel body and rotatably driven by a driving mechanism.

BACKGROUND OF THE INVENTION

Generally, the above-noted type of spining fishing reel, as disclosed in Japanese Utility Model Laid-Open Gazette No. Sho 47-20,792, is provided with a drag mechanism comprising a group of spool side braking members coupled with the spool and spool shaft side braking members coupled with the spool shaft, between the spool and the spool shaft and an adjuster for applying a predetermined braking force to rotation of the spool with respect to the spool shaft through the braking members, with the drag mechanism being adjusted to apply a predetermined braking force to rotation of the spool.

Since the braking force is adjusted by rotatably operating the adjuster within an entire range from a minimum value of O kg-f to the maximum of the braking force, when an angler intends to change the braking force corresponding to a pulling force of a hooked fish and to slip the spool by the pulling force to thereby prevent a fishing line from being cut, the adjuster may often be excessively loosened so as to apply an insufficient braking force to the rotation of the spool to enable the hooked fish to escape. On the other hand, a too large braking force may be applied resulting in snapping of the fishing line.

SUMMARY OF THE INVENTION

A main object of the invention is to provide a spinning fishing reel which applies to the rotation of the spool a minimum braking force preset corresponding to a target fish and also wherein the preset minimum braking force can be compensated to be adjustable to a maximum braking force, thereby eliminating the problem in heretofore known reels that misadjustment of the adjuster excessively decreases the braking force to result in a poor catch.

Another object of the invention is to provide a spinning fishing reel which can solve the problem wherein too large braking force given by the drag mechanism may cut the fishing line due to a pulling force of the hooked fish.

In order to attain the above objects, the present invention has been designed. A drag mechanism for the spinning fishing reel of the invention provided with a spool shaft and a spool mounted rotatably on the lengthwise front portion of the spool shaft and regulated from moving rearwardly thereof, is characterized by providing spool side braking members rotatable together with the spool, spool shaft side braking members held to the spool shaft, a first adjuster mounted on the fore end of the spool shaft so as to set a minimum braking force given to rotation of the spool, a second adjuster interposed between the first adjuster and the spool to adjust up to the maximum braking force the minimum braking force set by the first adjuster, and a transmission member supported non-rotatably and axially movably to the spool shaft to transmit an adjusting force of the first adjuster to the braking members.

The drag mechanism of the invention can adjust by the first adjuster the minimum braking force given to the spool to a desired value corresponding to a target fish and also adjust by use of the second adjuster the minimum braking force adjusted by the first adjuster. Hence, even when the second adjuster adjusts its braking force on the way of fishing-up, the minimum braking force set by the first adjuster can be compensated by the adjustment of the second adjuster, whereby there is no risk of excessively reducing the braking force by a misadjustment, resulting in that loss of hooked fish can be reliably avoided. Also, the adjustment by the second adjuster is regulated in a predetermined range, thereby solving the problem that the too large braking force applies onto the fishing line a load exceeding the yield strength of the line so as to cause a cut thereof.

In order to regulate the adjusting range of the second adjuster in the predetermined range, the aforesaid transmission member is interposed between the first adjuster and the second adjuster, and a cam means, by which the second adjuster is rotated to move axially, is provided, thereby performing the above regulation. Such regulation also be performed by other regulating means.

A coupling means for coupling the first adjuster with the second adjuster relative-rotatably to each other and in a manner that the second adjuster is axially movable in the predetermined range with respect to the first adjuster, is provided to enable the first and second adjusters to be formed as a unit, thereby simplifying the management for parts and improving the assembly efficiency thereof to the spool shaft.

Alternatively, the regulating means for regulating the adjusting range of the braking force by the second adjuster is not particularly provided, but the coupling means may serve also as the regulating means.

These and other objects of the invention will become more apparent from the detailed description and examples which follow.

DETAILED DESCRIPTION OF THE INVENTION

Figure 1:
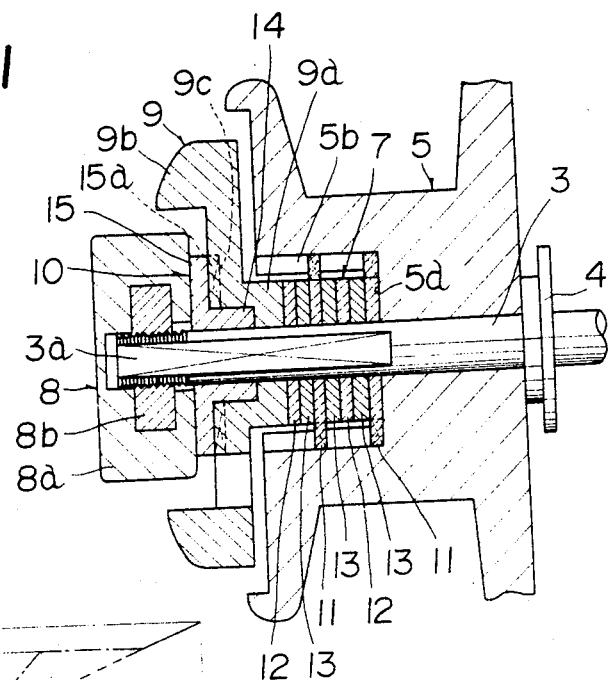
FIG. 1 is a sectional view of a first embodiment of a drag mechanism for a spinning fishing reel of the invention.
Figure 3:
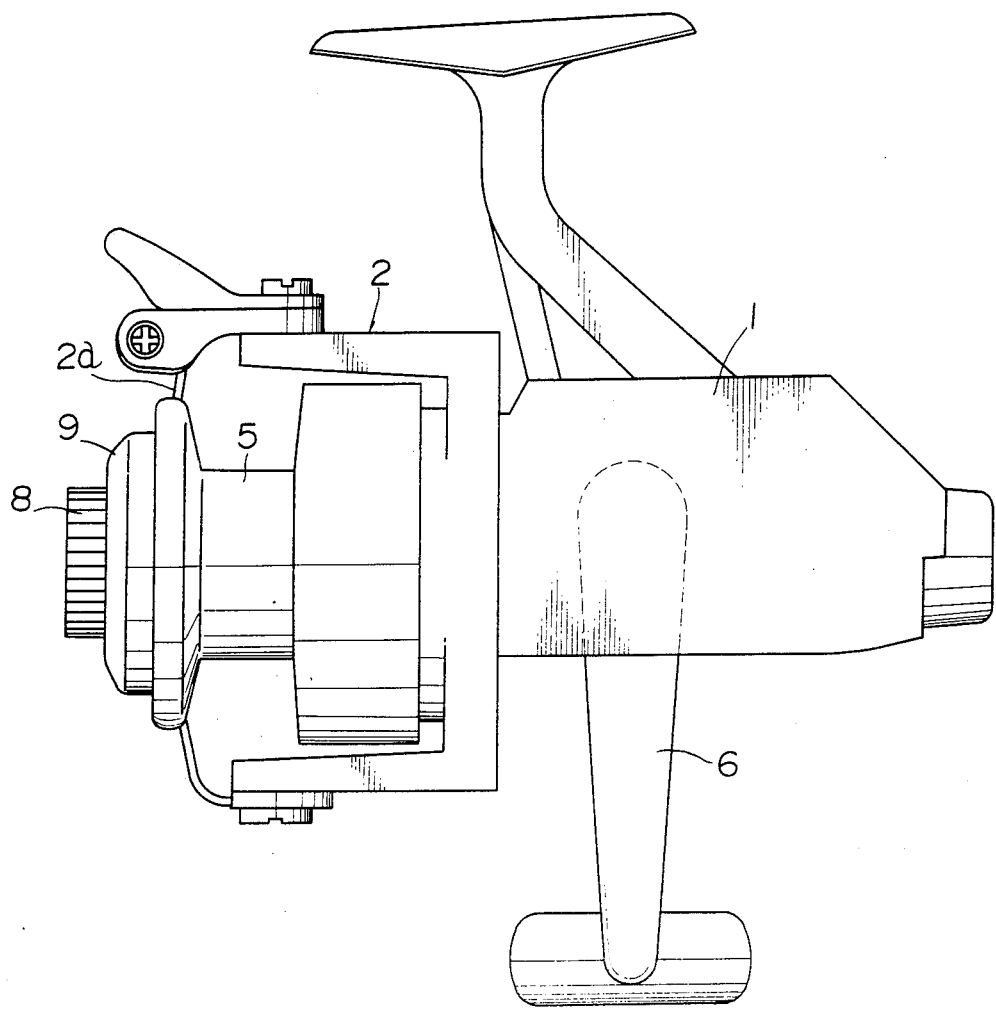
FIG. 3 is a side view of the entire spinning fishing reel, to which the present invention is applied.

The basic construction of a spinning fishing reel to which the present invention is applied is shown in FIG. 3. A rotary frame 2 having a bail arm 2a is supported rotatably through a cylindrical driving shaft to a through bore (not shown) at the front of a hollow reel body 1. A spool shaft 3 shown in FIG. 1 is supported non-rotatably and axially movably to the reel body 1. A spool 5 is regulated by a stopper 4 with respect to its axially rearward movement and is supported rotatably to the lengthwise front portion of spool shaft 3, and a handle 6 is supported rotatably to the side surface of reel body 1 through a handle shaft, so that the handle 6 is rotated to allow the rotary frame 2 to rotate through a driving mechanism and the spool shaft 3 is axially moved through a reciprocation mechanism, thereby winding a fishing line onto the spool 5.

In a first embodiment shown in FIG. 1, the spool 5 is provided at the front of its trunk with a cavity 5a, between the inner periphery of the cavity 5a and the outer periphery of the spool shaft 3 are provided braking members 11 and 12 constituting a drag mechanism. On an axial end of the spool shaft 3 projecting forwardly with respect to the spool 5 is screwably mounted a first adjuster 8 which sets a minimum braking force applied to the rotation of spool 5 by the braking members 11 and 12, in other words, an initial minimum load for rotation of the spool 5 with respect to the spool shaft 3. Between the first adjuster 8 and the front end face of spool 5 is rotatably provided a second adjuster 9 for adjusting in a predetermined range the minimum braking force set by the first adjuster 8. A cylindrical transmission member 10 for transmitting an adjusting force of the first adjuster 8 to the braking members 11 and 12 through the second adjuster 9 is supported non-rotatably and axially movably onto the spool shaft 3.

In the above construction, the drag mechanism comprises (1) disc-like spool-side braking members 11 which are non-rotatable and axially movable with respect to the spool 5, (2) disc-like spoolshaft-side braking members 12 non-rotatable and axially movable with respect to the spool shaft 3, and (3) disc-like washers 13 interposed between the braking members 11 and 12 to be rotatable relative to each other. Braking members 11 and 12 and washers 13 are axially disposed.

It is to be noted that washers 13 are not indispensable.

The first adjuster 8 comprises a control 8a formed mainly of synthetic resin and in the shape of a substantially round trob and a metallic core 8b having a threaded bore and inserted into the center of the control 8a. Core 8b screw with the axial end of the spool shaft 3.

The second adjuster 9 comprises; a boss 9a having a through bore into which the spool shaft 3 is inserted, a contact surface contacting with and urging the outermost one of the braking members 11 and 12 and washers 13, for example, the spool side braking member 12, and a cavity second adjuster 9 also has a round control 9b provided through a plurality of ribs extending radially outwardly from the boss 9a. At the outside of the boss 9a, two first cam faces 9c displaceable circumferentially and axially of the boss 9a are provided at a phase difference of 180°. At the surface of one rib or control 9b is provided a mark to read the position of the second adjuster 9 with respect to, for example, a mounting leg of the reel body 1, thereby enabling an amount of adjustment by the second adjuster 9 to be checked with ease through the mark.

Also, the second adjuster 9 has a smaller outer diameter than a flange of the spool 5 and the surface of the second adjuster 9 opposite to the flange at the spool 5 is disposed axially inwardly from the axially outside surface of the outer peripheral portion of the flange. Hence, the fishing line wound onto the spool 5, even when loosened to ride over the flange, is prevented from falling into a gap between the flange and the second adjuster 9.

The transmission member 10 comprises a cylinder 14 having a non-round through-bore to be inserted onto the spool shaft 3 and a disc 15. At the inner surface of the disc 15, two cam faces 15a engageable with the first cam faces 9c at the adjuster 9 are provided at a phase difference of 180° respectively. Also, cylinder 14 of transmission member 10 is inserted into the cavity of boss 9a and the second cam faces 15a engage with the first cam faces 9c respectively to bring the disc 15 into contact with one side surface of the first adjuster 8.

In addition, at the inner periphery of the cavity 5a at the spool 5 are provided splines 5b extending axially of the spool 5 to restrain the spool side braking members 11 from rotating with respect to the spool 5. At the outer periphery of the front end of spool shaft 3 is provided a non-round portion 3a having a pair of flat surfaces, thereby preventing the spool shaft side braking members 12 and transmission member 10 from rotating with respect to the spool shaft 3.

Figure 2:
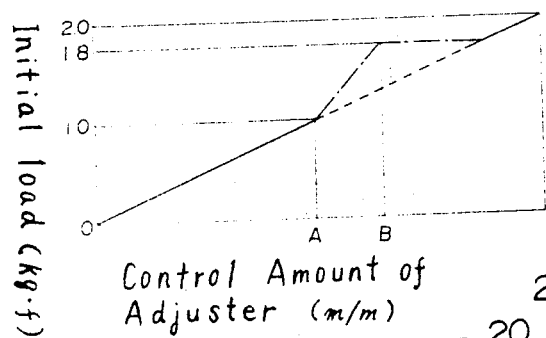
FIG. 2 is a characteristic view of the initial load by the drag mechanism.

When the fishing reel constructed as described above is used for fishing by drawing out the fishing line from the spool 5, the first adjuster 8 which has previously been screwably attached to the spool shaft 3 is rotatably operated to move the transmission member 10 and second adjuster 9 toward the braking members 11 and 12, thereby setting a minimum braking force, i.e., the minimum initial load applied by the drag mechanism. This initial load is set at a desired value from a minimum of 0 kg-f to a maximum of, for example, 2.0 kg-f. The minimum initial bad value applied by the first adjuster 8, as shown by the point A in FIG. 2, is set to, for example, 1 kg-f.

An angler waits for a fish bite with the braking force set in this minimum initial load.

Then, when a fish is hooked and pulls the line, the second adjuster 9 is rotatably operated corresponding to the pulling force of the hooked fish to thereby adjust the intial load within a predetermined range. When the second adjuster 9 is unidirectionally rotated, the engaging positions of the first cam faces 9c with the second cam faces 15a change in order, so that the second adjuster 9 moves toward the braking members 11 and 12 with respect to the first adjuster 8 and transmission member 10 so as to urge the braking members 11 and 12 closer together. This desirably adjusts the initial load in the predetermined range where the second adjuster 9 rotates at an angle of 180°, in other words, from the point A to the point B as shown by the chain line in FIG. 2. Thus, when the first adjuster 8 sets the initial load to, for example, 1.0 kg-f, the initial load is adjustable desirably within the range from 1.0 kg-f to the maximum of 2.0 kg-f, for example, in a load of 1.8 kg-f. When the first adjuster 8 sets the initial load to, example, the maximum of 2.0 kg-f, the second adjuster 9, even when operated, cannot of course increase the initial load more than the maximum of 2.0 kg-f. Also, in a case where the initial load of 1.0 kg-f set by the first adjuster 8 is adjusted by the second adjuster 9 to a load of, for example, 1.8 kg-f and thereafter the adjusted load 1.8 kg-f is again reduced to the initial load 1.0 kg-f set by the first adjuster 8, the second adjuster 9 need only be reversely rotated to perform quick adjustment.

Accordingly, the braking force corresponding to the minimum intial load set by the first adjuster 9 is alway compensated to the rotation of spool 5 for fishing, so that when the second adjuster 9 adjusts the braking force to the spool 5 corresponding to a pulling force by the hooked fish, the braking force is prevented from decreasing excessively, thereby enabling the angler to bring in the hooked fish without losing it. Also, the initial load set by the first adjuster 8 is adjustable by the second adjuster 9 within the predetermined range, thereby facilitating the adjustment corresponding to the pulling force by the hooked fish.

It should be noted that, in the first embodiment, the first and second cam faces 9c and 15a change their engaging positions by the rotation of second adjuster 8, thereby adjusting the minimum initial load toward the maximum side in the predetermined range. Alternatively, the intial load may be adjusted by providing a construction as shown in FIGS. 4 or 5.

Figure 4:
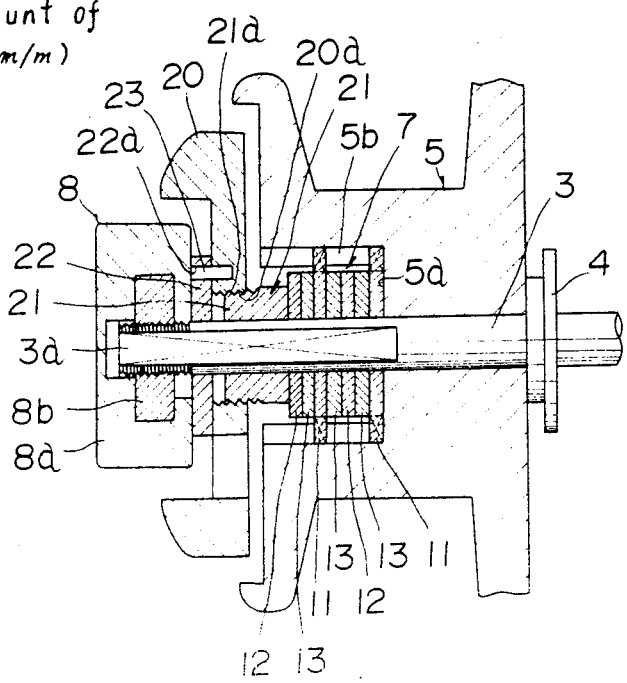
FIG. 4 is a sectional view of a second embodiment of the invention.
Figure 5:
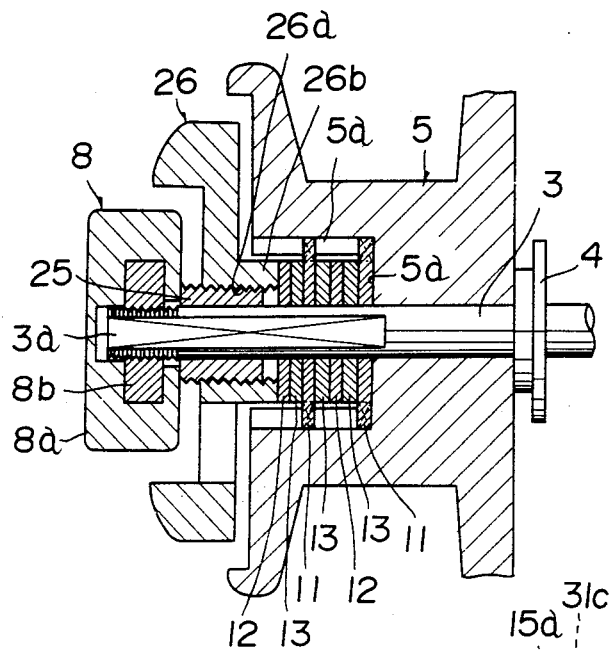
FIG. 5 is a sectional view of a third embodiment of the invention.

Referring to FIG. 4, a second embodiment of the invention is shown, in which a second adjuster 20 is substantially disc-shaped and has at its center a threaded bore 20a. A transmission member 21 is formed of a cylinder having at its center non-round through bore to be fitted onto the non-round portion 3a of spool shaft 3 and at one axial end a contact surface to abut against the outermost braking member 12. Between the second adjuster 20 and a first adjuster 8 is inserted a rotation regulator 22 formed of a disc having at its center a non-round through bore to be fitted onto the non-round portion 3a of spool shaft 3 and at its outer periphery an elongate slot 22a in a circular arc. Transmission member 21 is provided at its outer periphery with a screw thread 21a screwable with the threaded bore 20a, so that the transmission member 21 is supported non-rotatably and axially movably to the spool shaft 3 and the second adjuster 20 screws with the transmission member 21. Also, the second adjuster 20 is provided with a regulating pin 23 to be fitted into the elongate slot 22a at the regulator 22 supported non-rotatably and axially movably to the spool shaft 3. Thus, second adjuster 20 is rotatable only in a predetermined range relative to shaft 3 by use of the pin 23.

In this case, the adjusting force caused by rotation of the first adjuster 8 moves the regulator 22, second adjuster 20 and transmission member 21, toward the braking members 11 and 12, whereby the braking members 11 and 12 are urged to set the initial load thereon.

Also, the second adjuster 20 is rotatably operated to move the transmission member 21 toward the braking members 11 and 12 to more strongly urge them to thereby adjust the intial load set by the first adjuster 8. In this case, the second adjuster 20 rotates only within the range determined by the elongate slot 22a, thereby regulating the adjusting range of the braking force applied by the second adjuster 20.

Referring to FIG. 5, a third embodiment of the invention is shown, in which a transmission member 25 is cylindrical, has at its center a non-round through bore to be fitted onto the non-round portion 3a of spool shaft 3 and at its outer periphery a screw thread. Transmission member 25 is supported non-rotatably and axially movably to the spool shaft 3 and abuts at one axial end against the first adjuster 8. A second adjuster 26 is substantially disc-shaped and has a cylindrical boss 26b having at the center a threaded bore 26a and screws with the transmission member 25.

In this case, the adjusting force caused by rotation of the first adjuster 8 moves the transmission member 25 and second adjuster 26 toward the braking members 11 and 12 and urges them, thereby setting the initial load thereon.

Also, the second adjuster 26 is rotatably operated to move toward the braking members 11 and 12 with respect to the transmission member 25, thereby more strongly urging the braking members 11 and 12 to adjust the minimum initial load set by the first adjuster 8.

In any of the aforesaid embodiments, the first adjuster 8 can set the minimum braking force (initial load) to be given to the rotation of spool 5 and the second adjusters 9, 20 and 26 are operated to enable the minimum braking force set by the first adjuster 8 to be adjusted. Hence, the minimum braking force set by the first adjuster 8 can always be compensated, thereby preventing the braking force given to the spool 5 from decreasing excessively and facilitating adjustment corresponding to the pulling force by the hooked fish. Thus, quick and smooth fishing can be performed without losing the hooked fish.

In the aforesaid embodiments, the first adjuster 8, second adjuster 9, 20 and 26, and transmission members 10, 21 and 25 are separate from each other and assembled divisibly to the spool shaft 3. The second adjusters 9, 20 and 26 are rotatable relative to the first adjuster 8 and coupled as a unit to be axially movable in a predetermined range, thereby enabling the assembly efficiency to be improved.

Figure 6:
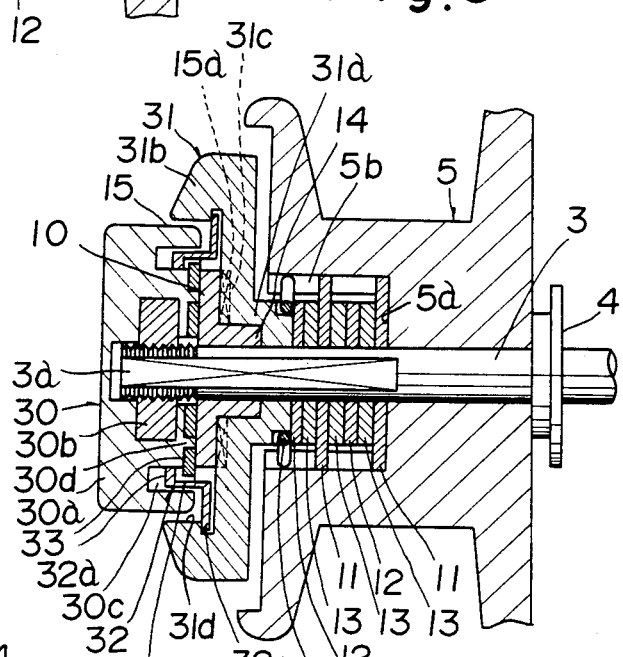
FIG. 6 is a sectional view of a fourth embodiment of the invention.

A fourth embodiment shown in FIG. 6 is a modification of the first embodiment, in which a first adjuster 30 and a second adjuster 31 are coupled with each other through a coupling member 32.

In detail, the first adjuster 30, the same as in the first embodiment, comprises a knob-like control 30a and a metallic core 30b, the control 30a having at its inner surface an annular groove 30c. The second adjuster 31, also as the same as in the first embodiment, comprises a boss 31a and a control 31b, the control 31b having at the center of its axially outside surface cam faces 31c opposite to the cam faces 15a of transmission member 10 and at its outer peripheral portion an annular groove 31d.

The coupling member 32 comprises a disc 32a movably insertable into the annular groove 30c, a pair of arms 32b extending axially outwardly from the outer periphery of the disc 32a, and retaining portions 32c extending radially outwardly from the utmost ends of arms 32b respectively. The disc 32a of coupling member 32 is inserted into the annular groove 30c of first adjuster 30 to be rotatable and axially movable corresponding to the maximum adjustment by the second adjuster 31. The respective retaining portions 32c are inserted into the annular groove 31d of second adjuster 31 through the deflected arms 32b. On the axially inner surface of the first adjuster 30 is mounted a round lock plate 33 having a retaining portion abutting against the disc 32a at the coupling member 32, thereby restraining the coupling member 32 from escaping from the first adjuster 30. The coupling member 32 couples the first and second adjusters 30 and 31, and these members together with the transmission member 10 are thus formed as a unit. In addition, the lock plate 33 is provided with a plurality of through bores and the first adjuster 30 is provided at its axially inner surface with protuberances 30d fitted into the through bores, the protuberances 30d being inserted therein and thereafter welded at their utmost ends to fix the lock plate 33.

Also, the reason for making the coupling member 32 rotatable with respect to the first and second adjusters 30 and 31 and movable relative to each other corresponding to the maximum adjustment is that one of the adjusters 30 and 31 is made operable without affecting the other and that the adjusting range by the second adjuster 31 is regulated.

In FIG. 6, the same components as those in FIG. 1 are shown by the same reference numerals and indifferent in construction.

Figure 7:
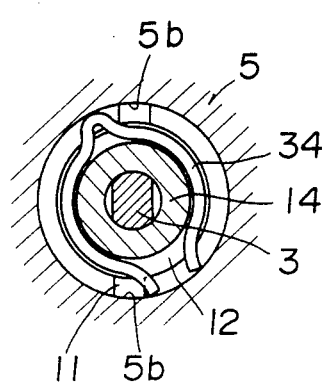
FIG. 7 is a sectional view of a portion including a snap ring in the fourth embodiment.

Furthermore, the fourth embodiment shown in FIG. 6 is provided in the cavity 5a at the spool 5 with a circumferential annular groove intersecting the splines 5b, and houses in the cavity 5a a substantially c-shaped snap ring 34 which has projections entering into the annular grooves as shown in FIG. 7. Snap ring 34 holds the braking members 11 and 12 to the spool 5 and prevents them from escaping therefrom.

The fishing reel constructed as described above is assembled such that the spool 5 is fitted rotatably onto the spool shaft 3, the braking members 11 and 12 and washers 13 are fitted onto the spool shaft 3 as shown in FIG. 6, the snap ring 34 is inserted into the annular groove, thereafter the second adjuster 31 and transmission member 10 as a unit with the coupling member 32 are fitted onto the spool shaft 3, and the first adjuster 30 screws therewith.

Thus, the first and second adjusters 30 and 31 and transmission member 10 formed as a unit are easy to assemble.

In a case where the adjusters 30 and 31 are removed from the reel for exchanging the spool 5, the first adjuster 30 is unscrewed from the spool shaft 3, so that the second adjuster 31 and transmission member 10 and first adjuster 30 as a unit are removed from the spool shaft 3 with ease, thereby facilitating the exchange of the spool 5.

Since the snap ring 34 locks the braking members 11 and 12 and washers 13, after the first and second adjusters 30 and 31 are removed from the spool shaft 5, the braking members 11 and 12 and washers 13 are prevented from escaping from spool shaft 5.

In the aforesaid fourth embodiment, the coupling member 32 is separate from the first and second adjusters 30 and 31 and rotatably interposed therebetween. Alternatively, as shown by a fifth embodiment in FIG. 8, a second adjuster may comprise a main body 41 having a boss 41a and cam faces 41c and a cover 42 mounted on one side of the main body 41 through a screw 43, and an outward flange 40a may be formed at a first adjuster 40 and engage with an annular engaging recess 42a formed at the inside of cover 42, whereby the cover 42 may couple the first adjuster 40 with the main body 41 of second adjuster.

In greater detail, the main body 41 of the second adjuster is substantially disc-shaped and provided at its center with a boss 41a. A pair of arms 41d and 41e project radially outwardly from the main body 41, and cam faces 41c engageable with the cam faces 15a at the transmission member 10 are formed at the outside surface of the disc-like portion at the boss 41a.

In addition, the transmission member 10, the same as in the first embodiment, engages at the cam faces 15a with the cam faces 41c of the second adjuster and is inserted into a cavity at the boss 41a *of main body 41, thereby being rotatable relative to the main body 41.*

Figure 10:
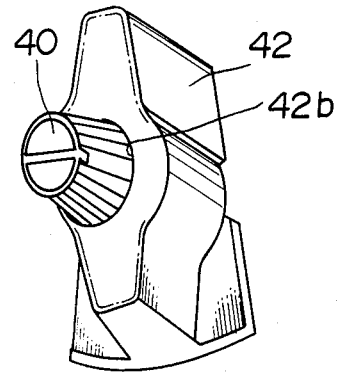
FIG. 10 is a perspective view of first and second adjusters as a unit in the fifth embodiment.
Figure 9:
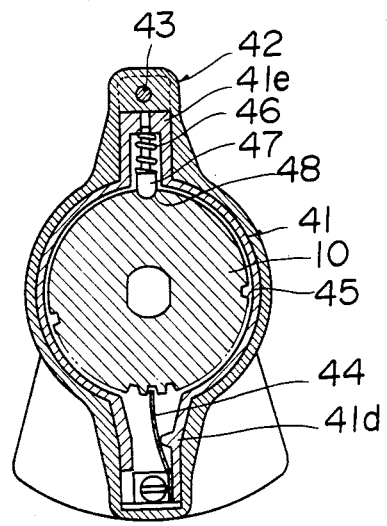
FIG. 9 is a sectional view taken on the line IX—IX in FIG. 8, showing a second adjuster and a transmission member.

The cover 42, as shown in FIG. 10, is shaped like an elongate knob and, has at its center an insertion bore 42b for inserting therein the first adjuster 40. Engaging recess 42a is formed at the depth of insertion bore 42b. Hence, the first adjuster 40, before the cover 42 is attached to the main body 41 through the screw 43, is inserted into the bore 42b from the rear of the cover 42 and engages at the flange 40a with the engaging portion 42a of cover 42, thereby being prevented from escaping from the cover 42.

The first adjuster 40, as above-mentioned, is inserted into the cover 42, engages at the flange 40a with the engaging portion 42a, and is fixed by the screw 43 to the main body 41, thereby coupling with the main body 41 of the second adjuster through the transmission member 10. Between the engaging portion 42a at the cover 42 and the flange 40a at the first adjuster 40 opposite thereto, a gap is formed which corresponds to the maximum adjustment amount by the second adjuster, in other words, the maximum axial displacement thereof caused by engagement of the first cam faces 15a with the second cam faces 41c, whereby the cover 42 is fixed to the main body 41 by the screw. As a result, the first and second adjusters are rotatable relative to each other and the body 41 of the second adjuster is axially movable to an extent only of the gap with respect to the first adjuster 40.

Incidentally, on one arm 41d of main body 41 of the second adjuster is mounted a sound generating pawl 44 formed of a leaf spring. Sound generating pawl 44 engages with splines 45 formed at the outer periphery of the transmission member 10 to generate sounds when the second adjuster is operated. The other arm 41e of main body 41 is provided with an engaging member 47 biased by a spring 46, so that the engaging member 47 engages with a recess 48 formed at the outer periphery of transmission member 10 to set the reference position of the second adjuster, thereby enabling the braking force to increase or decrease on the basis of the reference position.

Figure 8:
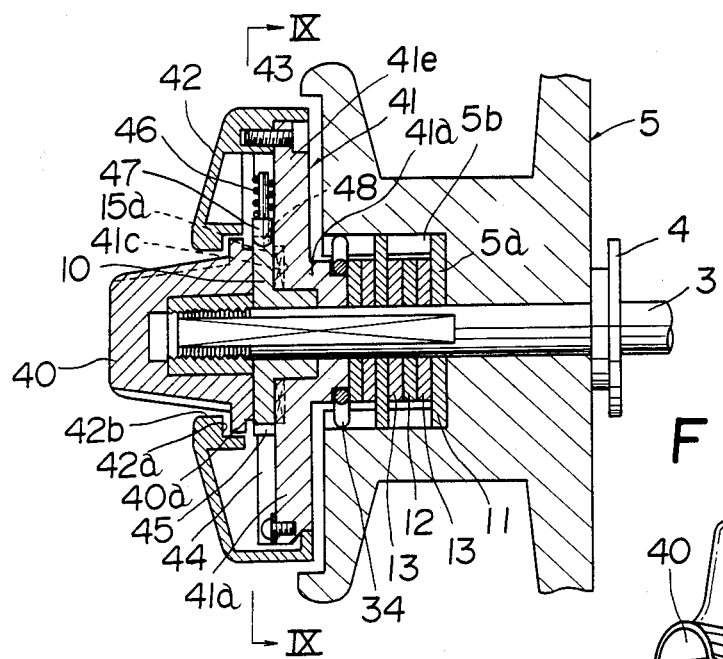
FIG. 8 is a sectional view of a fifth embodiment of the invention.

In addition, in FIG. 8, components which are the same as those in FIG. 1 are shown by the same reference numerals and indifferent in construction.

Figure 11:
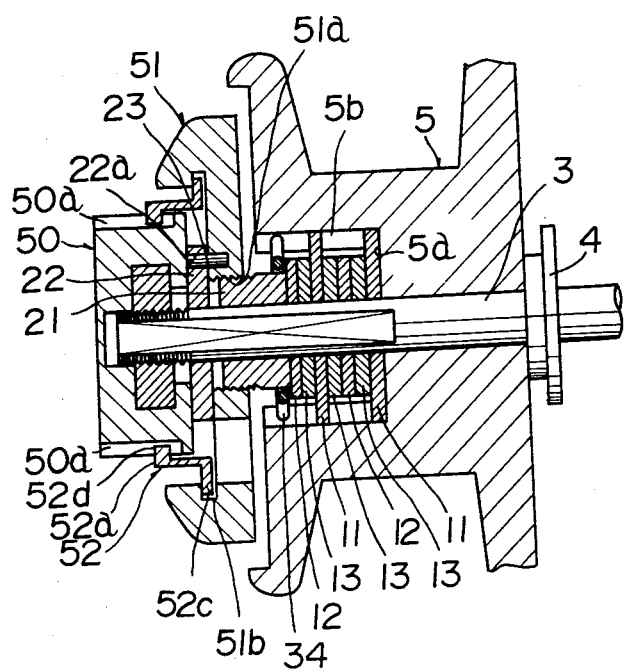
FIG. 11 is a sectional view of a sixth embodiment of the invention.

Next, a sixth embodiment shown in FIG. 11 is a modification of the second embodiment shown in FIG. 4, in which a first adjuster 50 and a second adjuster 51 are coupled with each other through a coupling member 52.

Figure 12:
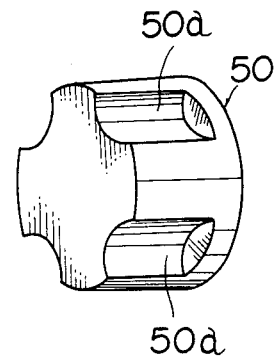
FIG. 12 is a perspective view of a first adjuster in the sixth embodiment.

In the sixth embodiment in FIG. 11, the second adjuster 51 is substantially disc-shaped and has at its center a threaded bore 51a. A transmission member 21 the same as in the fourth embodiment is formed of a cylinder having at its center a non-round through bore to be fitted onto the non-round portion 3a of spool shaft 3 and at one axial end a contact surface to abut against the braking member 12. Between the first adjuster 50 and the second adjuster 51 is interposed a substantially disc-shaped rotation regulator 22 having at its center a non-round through bore and at its outer peripheral portion an elongate slot 22a in a circular arc. A screw thread engageable with the threaded bore 51a is provided at the outer periphery of the transmission member 21 which is supported non-rotatably and axially movably to the spool shaft 3. Second adjuster 51 screws with the transmission member 21, and the second adjuster 51 is provided with a regulating pin 23 projecting therefrom, which is to be fitted into the elongate slot 22a of regulating member 22 supported non-rotatably and axially movably to the spool shaft 3. As a result, second adjuster 51 is allowed to rotate by the pin 23 only in a predetermined range with respect to the rotation regulator 22. In addition, the first adjuster 50 is provided at its outer periphery with splines 50a extending axially from the outer periphery as shwon in FIG. 12. An engaging projection 52d engageable with the splines 50a is provided of inner periphery of disc 52a at the coupling member 52 which is supported non-rotatbly and axially movably onto the outer periphery of the first adjuster 50. An engaging portion 52c of coupling member 52 engages with an annular groove 51b of second adjuster 51 so as to couple the first and second adjusters 50 and 51, thereby causing adjusters 50 and 51, transmission member 21 and regulator 22 to be a unit.

In addition, in FIG. 11, components which are the same as those in FIG. 4 are designated by the same reference numerals and indifferent in construction.

Figure 13:
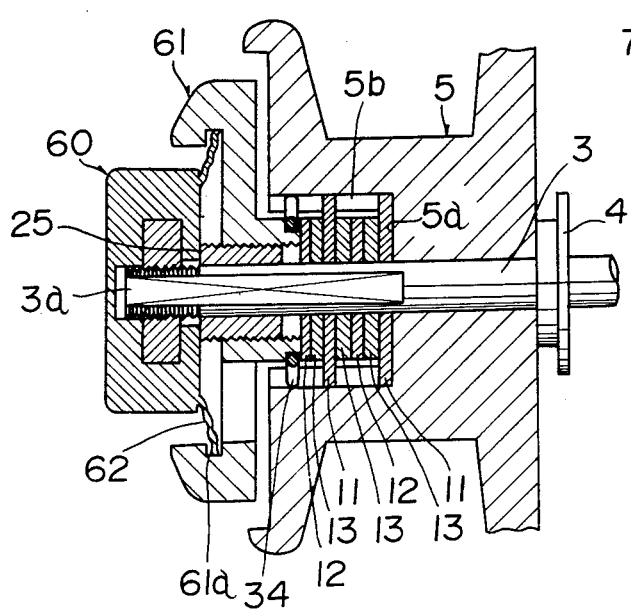
FIG. 13 is a sectional view of a seventh embodiment of the invention.

Furthermore, a seventh embodiment of the invention is shown in FIG. 13, which is a modification of the third embodiment in FIG. 5. In FIG. 13, a first adjuster 60 and a second adjuster 61 are coupled by a coupling member 62 integral with the first adjuster 60.

In detail, the coupling member 62 integral with the first adjuster 60 is fitted into an annular groove 61a of second adjuster 61, thereby coupling the first and second adjusters 60 and 61 with each other and assembling them together with a transmission member 25 as a unit.

Alternatively, the coupling member 62 may be integral with the second adjuster 61.

In addition, in FIG. 13, components which are the same as those in FIG. 5 and indifferent therefrom in construction are designated by the same reference numerals.

As seen from the fourth through seventh embodiments in FIGS. 6 to 13, the coupling membes 32, 42, 52 and 62 are used to couple the first and second adjusters with each other, thereby enabling these members to be a unit and the parts to be managed with ease. Hence, the first and second adjusters and transmission member are easy to assemble with the spool shaft to thereby improve the working efficiency. Also, the adjusters and transmission members are removable from the spool shaft for facilitated repair.

Also, the coupling member couples the first and second adjusters relative-rotatable to each other, and couples the second adjuster axially movably in a predetermined range with respect to the first adjuster, thereby enabling the adjusting range for the second adjuster to be regulated. Hence, the regulating means as shown in FIGS. 4 and 11 are not required.

In the embodiments shown in FIGS. 4, 5, 11 and 13, it is preferable that the first adjusters 8, 50 and 60 screwable with the spool shaft 3 each have a larger thread pitch than the respective second adjusters 20, 26, 51 and 61 engageable with the transmission members 21 and 25.

Thus, the rising edge of the initial load with respect to an amount of operating the second adjuster can be made larger, resulting in that quick adjustment can be performed to that extent.

Figure 14:
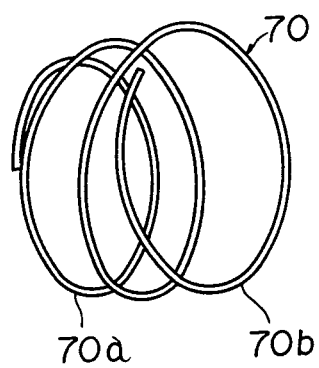
FIG. 14 is a perspective view of another example of a coupling member.

The coupling members 32 and 52 in the fourth and sixth embodiments shown in FIGS. 6 and 11 are formed mainly of synthetic resin or metal plates. Alternatively, a wire rod , as shown in FIG. 14, may be used as a coupling member 70 applied to these embodiments, in which round fitting portions 70a and 70b are provided at both ends of the coupling member 70, the one engaging portion 70a being fitted into the annular groove 30c and splines 50a provided at the first adjuster 30 and 50, and the other engaging portion 70b being fitted to the annular grooves 31d and 51b at the second adjusters 31 and 51 respectively.

Although several embodiments have been described, they are merely exemplary of the invention and not to be construed as limiting, the invention being defined solely by the appended claims.

What is claimed is:

1. A spinning reel comprising:
   a spool shaft,
   a spool rotatably supported at a lengthwise front portion of said spool shaft, and
   a drag mechanism, said drag mechanism comprising:
   (a) spool-side braking members supported to rotate with said spool relative to said spool shaft,
   (b) spool shaft-side braking members fixed non-rotatably relative to said spool shaft,
   (c) a first adjuster means mounted on a front end portion of said spool shaft, for setting a minimum braking force applied against rotation of said spool relative to said spool shaft,
   (d) a second adjuster means mounted on said spool shaft and interposed between said first adjuster means and said spool, for adjusting said braking force applied by said first adjuster means up to a predetermined maximum braking force, and
   (e) a transmission member supported non-rotatably and axially movable relative to said spool shaft to transmit to said spool-side braking members and said spool shaftside braking members said braking force applied by said first adjusting means.

2. A spinning reel according to claim 1, further comprising a regulating means for regulating an adjustment range of the braking force applied by said second adjuster means.

3. A spinning reel according to claim 1, wherein said second adjuster means is provided with a boss for urging said braking members and is supported rotatably to said spool shaft, said transmission member is interposed between said first adjuster means and said second adjuster means, and between said second adjuster means and said transmission member is provided a cam means for moving said second adjuster means axially in a predetermined range in response to rotation of said second adjuster.

4. A spinning reel according to claim 1, wherein said transmission member is provided with a cylindrical member for urging said braking members, said cylindrical member having at its outer periphery a screw thread, for screwing with said second adjuster means.

5. A spinning reel according to claim 4, further comprising a regulating means for regulating a rotational range of said second adjuster means.

6. A spinning reel according to claim 1, wherein said transmission member comprises a cylindrical member provided at its outer periphery with a screw thread, said second adjuster means is provided with a cylindrical boss screwable with the outer periphery of said transmission member, said boss making contact with said braking member.

7. A spinning reel according to claim 1, wherein said spool shaft is provided at a lengthwise front portion thereof with a screw thread, said first adjuster means screwing therewith.

8. A spinning reel according to claim 1, wherein a sound generating mechanism is provided between said second adjuster means and said transmission member.

9. A spinning reel according to claim 1, wherein a reference position setting means for setting a reference position of said second adjuster means is provided between said second adjuster means and said transmission member.

10. A spinning reel according to claim 1, further comprising a coupling means for coupling said first adjuster means and said second adjuster means to be rotatable relative to each other and for allowing said second adjuster means to move axially in a predetermined range with respect to said first adjuster means.

11. A spinning reel according to claim 10, wherein said predetermined range of axial movement of said second adjuster means with respect to said first adjuster means constitutes a range of braking force adjustment by said second adjuster means.

12. A spinning reel according to claim 10, wherein said coupling means is provided with a coupling member separate from said first adjuster means and said second adjuster means.

13. A spinning reel according to claim 10, wherein said coupling means is provided with a coupling member integral with one of said first adjuster means and said second adjuster means.

14. A spinning reel according to claim 10, wherein said second adjuster means is provided with a cover for covering an outside portion of said second adjuster means, said first adjuster means is provided with an outward flange, said cover being provided with an insertion bore having a diameter smaller than an outer diameter of said flange and in which said first adjuster means is inserted, said insertion bore being provided with an engaging portion engageable with said flange.

* * * * *